United States Patent [19]
Tajima et al.

[11] Patent Number: 5,975,534
[45] Date of Patent: Nov. 2, 1999

[54] SEALING DEVICE

[75] Inventors: Eiji Tajima, Iwata-gun; Kazuhiro Baba, Musashino; Shinji Nishio, Yokohama, all of Japan

[73] Assignee: NTN Corporation, Osaka, Japan

[21] Appl. No.: 08/839,314

[22] Filed: Apr. 17, 1997

[30]   Foreign Application Priority Data

Apr. 24, 1996  [JP]  Japan ................................. 8-129084

[51] Int. Cl.⁶ ..................................................... F16J 15/16
[52] U.S. Cl. ........................ 277/353; 277/402; 277/562; 277/572; 277/566
[58] Field of Search ........................... 384/486; 277/352, 277/353, 402, 562, 565, 572, 566

[56]         References Cited

U.S. PATENT DOCUMENTS

| | | | |
|---|---|---|---|
| 4,106,781 | 8/1978 | Benjamin et al. | 277/353 |
| 4,434,985 | 3/1984 | Sonnerat | 277/353 |
| 4,525,082 | 6/1985 | Brandenstein et al. | 277/353 X |
| 5,348,312 | 9/1994 | Johnston | 277/402 X |
| 5,419,642 | 5/1995 | McLarty | 384/486 |
| 5,431,413 | 7/1995 | Hajzler | 277/353 X |
| 5,522,600 | 6/1996 | Duckwall | 277/402 |

FOREIGN PATENT DOCUMENTS 57-103930  6/1982  Japan .

*Primary Examiner*—James R. Brittain
*Assistant Examiner*—Gary Grafel
*Attorney, Agent, or Firm*—Birch, Stewart, Kolasch & Birch, LLP

[57]             ABSTRACT

A sealing device designed to minimize accumulation of a fluid medium trapped therein to thereby increase a sealing performance and adapted to seal a space between inner and outer peripheral members rotatable relative to each other. The sealing device includes a generally L-sectioned annular sealing plate fitted to one of the inner and outer peripheral members and a generally L-sectioned annular sealing element fitted to the other of the inner and outer peripheral members so as to confront the sealing plate. The sealing plate has a radial wall and a tilted wall extending from the radial wall so as to incline inwardly thereof, and the sealing element includes a generally L-sectioned base plate provided with an elastic member. The elastic member has a side lip slidably engageable with the radial wall of the sealing plate and a radial lip slidingly engageable with a cylindrical sleeve of the sealing plate.

7 Claims, 3 Drawing Sheets

SEALING DEVICE

BACKGROUND OF THE INVENTION

1. Field of the Invention

The present invention generally relates to a sealing device adapted to be disposed between inner and outer members rotatable relative to each other, for example, inner and outer races of a rolling contact bearing or between a rotary shaft and a housing through which the rotary shaft extends and, more particularly, to an improvement in and for the sealing device of a type utilizing a combination of a sealing plate such as a slinger and a sealing element including an elastic member.

2. Description of the Prior Art

This type of sealing device is disclosed in, for example, the Japanese Laid-open Patent Publication No. 57-103930 published in 1982, and is largely employed in various applications. This sealing device is reproduced in FIG. 8 and comprises, as shown therein, an annular sealing plate 51 of a generally L-shaped cross-section adapted to be fixedly mounted on the inner peripheral member, an annular sealing element 52 of a generally L-shaped cross-section adapted to be secured to the outer peripheral member and an elastic member 53 provided on the sealing element 52. The elastic member 53 has a side lip 54 and a radial lip 55 both formed integrally therewith. In an assembled condition, the sealing plate 51 and the sealing element 52 are positioned in face-to-face relation with each other with the elastic member 53 positioned between the sealing plate 51 and the sealing element 52. The side and radial lips 54 and 55 of the elastic member 53 are held in sliding contact with a radial wall 51b of the sealing plate 51 and a cylindrical sleeve 51a of the sealing plate 51, respectively.

The prior art sealing device shown in FIG. 8 has been found to have a problem. Specifically, the prior art sealing device has no way of allowing a fluid medium such as muddy water, which has entered a space delimited between the sealing plate 51 and the sealing element 52, to be expelled to the outside. Therefore, the fluid medium once entering the space tends to be accumulated therein. The consequence is that the side lip 54 is kept immersed in the fluid medium accumulated within the space between the sealing plate 51 and the sealing element 52. For this reason, the side lip 54 seizes muddy particles and/or sands, eventually evolving heat which in turn results in incapability of sliding in contact with the radial wall of the sealing plate 51; This brings about reduction in sealing performance of the sealing device.

SUMMARY OF THE INVENTION

Accordingly, the present invention has been devised to substantially eliminate the above discussed problem inherent in the prior art sealing device and is designed to provide an improved sealing device wherein the amount of the fluid medium trapped inside the sealing device is minimized to increase the sealing performance.

To this end, the present invention provides a sealing device for sealing a space between inner and outer peripheral members rotatable relative to each other which comprises an annular sealing plate of a generally L-shaped cross-section adapted to be secured to one of the inner and outer peripheral members and a sealing element of a generally L-shaped cross-section adapted to be secured to the other of the inner and outer peripheral members so as to confront the sealing plate.

More specifically, according to one aspect of the present invention, the sealing device comprises a sealing plate of a generally L-shaped cross-section fitted to one of the inner and outer peripheral members and including a radial wall, having a free end formed with a tilted wall inclined inwardly of the sealing plate, and a cylindrical wall, a sealing element fitted to the other of the inner and outer peripheral members so as to confront the sealing plate and comprising a base plate of a generally L-shaped cross-section including a radial wall, and an elastic member provided on the base plate. The elastic member includes a first side lip and a radial lip. The first side lip extends from the radial wall of the base plate and has a free end held in contact with the tilted wall of the sealing plate, whereas the radial lip extends from the radial wall of the base plate and has a free end held in contact with the cylindrical sleeve of the sealing plate.

According to the present invention, even though when in use, a fluid medium such as, for example, muddy water splashing over the sealing device may deposit on a radially outer surface of the first side lip which is then in sliding contact with the inner surface of the sealing plate, the provision of the tilted wall on a radially outward portion of the sealing plate effectively serves to minimize a trap space defined outside the side lip within the sealing plate and in which the fluid medium tends to be trapped. For this reason, the fluid medium finds difficulty accumulating within the trap space, thereby eliminating the problem associated with generation of heat and defective sliding contact of the side lip which would otherwise be brought about when the side lip seizes muddy particles and/or sands contained in the fluid medium, thereby increasing the sealing performance. It is to be noted that the fluid medium entering further over the side lip is prevented by the radial lip from leaking further over the radial lip.

Where a lubricant oil is filled inside the inner space sealed off from the outer space by the sealing device of the present invention, any possible leakage of the lubricant oil is effectively hampered by the radial lip. Accordingly, with the sealing device of the present invention, the lifetime of, for example, the machine tool in which the sealing device of the present invention is employed can advantageously be increased. Also, since the structure is simple, the manufacturing cost can be reduced and the number of manufacturing process steps can also be decreased.

In the sealing device of the structure described above, a second side lip may be employed so as to extend from a portion adjacent a free end of the radial wall of the base plate. In this case, the second side lip has its free end held in contact with a non-tilted region of the radial wall of the sealing plate.

Where the inner peripheral member is a rotatable member and the sealing plate is fitted to the inner peripheral member, the fluid medium entering the inside of the sealing plate can be effectively expelled to the outside by the action of a centrifugal force exerted by rotation of the sealing plate. Even if the fluid medium entering the inside of the sealing plate enters further notwithstanding the centrifugal force, the second side lip provides an effect of preventing the liquid medium from being further urged. Also, if the radial lip is so shaped as to extend in a direction counter to the radial wall of the sealing plate, any possible leakage of the lubricant oil sealed by the sealing device can effectively be avoided.

In another preferred embodiment of the present invention, the base plate of the sealing element is formed with a tilted wall that inclines towards the radial wall of the sealing plate, and the second side lip extends from the tilted wall of the base plate towards the radial wall of the sealing plate. Because of this, the second side lip can have a reduced length.

Also, the sealing plate may be fitted to either the inner peripheral member which is rotatable or the outer peripheral member which is rotatable. Where the sealing plate is fitted to the rotatable inner peripheral member, an air current induced outside the tilted wall of the sealing plate brings about a sucking effect by which a water component and/or foreign matter contained in the fluid medium strapped within an inner space of the sealing device can be positively expelled to the outside of the sealing device.

According to another aspect of the present invention, the sealing element is provided with an elastic member formed integrally with a plurality of side lips and a radial lip. The plurality of the side lips extend from the radial wall of the base plate and have respective free ends held in contact with the radial wall of the sealing plate. The radial lip has a free end held in contact with the cylindrical sleeve of the sealing plate.

With this structure, since the side lips are employed in a plural number, the space partitioned by the outer side lip within the sealing plate which serves as a space into which the fluid medium may first enter can be reduced. For this reason, even with this structure, any possible accumulation of the fluid medium can be suppressed to enhance the sealing effect. The provision of the radial lip is effective to avoid any possible leakage of the lubricant oil accommodated within the inner space sealed off by the sealing device. In addition, since the side lips and the radial lip are integrally formed with the single elastic member, not only can the number of the necessary component parts be reduced, but also the number of the manufacturing process steps can be reduced.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
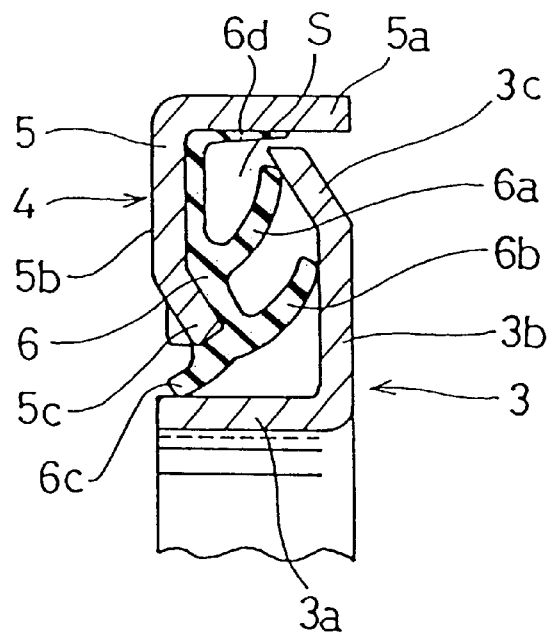
FIG. 1 is a fragmentary sectional view showing a sealing device according to a first preferred embodiment of the present invention.

A sealing device according to a first preferred embodiment of the present invention will now be described with reference to FIGS. 1 and 2. The sealing device is, as best shown in FIG. 2, used to seal an annular space delimited between an inner peripheral member 1 and an outer peripheral member 2 and comprises a generally L-sectioned annular sealing plate 3 and an annular sealing element 4, both accommodated within a space between the inner and outer peripheral members 1 and 2 with the sealing plate 3 and the sealing element 4 confronting each other. In the practice of the present invention, the outer peripheral member 2 may be either a housing of any of various appliances or a connecting rod of a type generally employed in reciprocating engines whereas the inner peripheral member 1 may be a rotary body such as, for example, a crankshaft inserted through the outer peripheral member 2. The inner and outer peripheral members 1 and 2 are coupled with each other for rotation relative to each other through a bearing or a caged roller assembly (both not shown). Alternatively, the inner and outer peripheral members 1 and 2 may be inner and outer races, respectively, of, for example, a bearing assembly.

Figure 2:
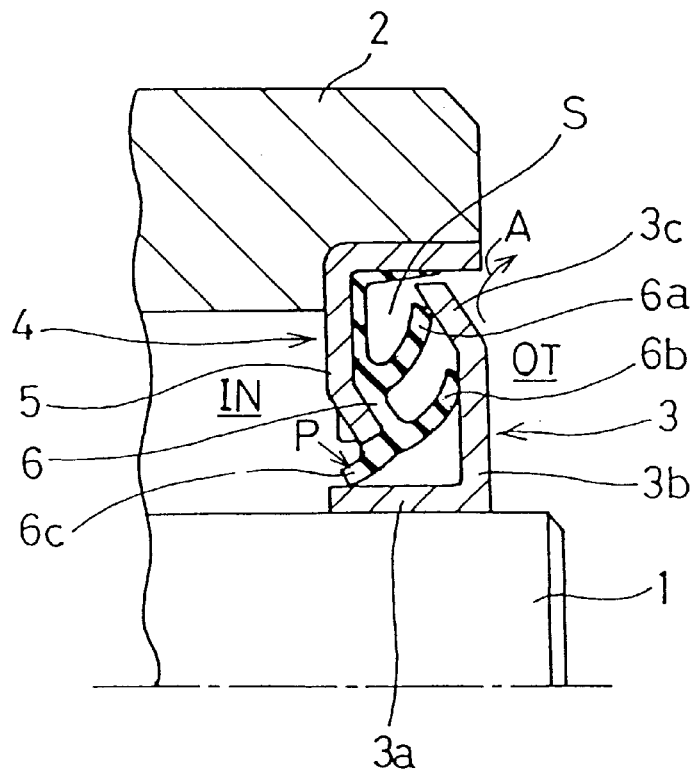
FIG. 2 is a fragmentary sectional view showing a manner of mounting of the sealing device shown in FIG. 1.

The sealing plate 3 is of one-piece construction including, as best shown in FIG. 1, a cylindrical sleeve 3a, a radial wall 3b extending generally or substantially radially outwardly from one end of the cylindrical sleeve 3a, and a tilted wall 3c extending from an outer peripheral portion of the radial wall 3b and tilted leftwards, as viewed therein, so as to overlay the cylindrical sleeve 3a. This sealing plate 3 is fixedly mounted on the inner peripheral member 1 with the cylindrical sleeve 3a press-fitted to an outer peripheral surface of the inner peripheral member 1. The sealing plate 3 may serve as a slinger and is made of metallic material.

The sealing element 4 is in the form of a generally L-sectioned base plate 5 provided with an elastic member 6 made of rubber or synthetic resin. The L-sectioned base plate 5 is of one-piece construction including a cylindrical bushing 5a, a radial wall 5b extending generally or substantially radially inwardly from one end of the cylindrical bushing 5a, and a tilted wall 5c extending from an inner peripheral portion of the radial wall 5b and tilted rightwards, as viewed therein, so as to be positioned beneath the cylindrical bushing 5a. This sealing element 4 is fixedly mounted inside the outer peripheral member 2 with the cylindrical bushing 5a press-fitted to an inner peripheral surface of the outer peripheral member 2. In an assembled condition with the sealing device accommodated within the space between the inner and outer peripheral members 1 and 2 as shown in FIG. 2, the tilted wall 5c of the base plate 5 is inclined relative to the radial wall 5b thereof so as to have its free end positioned axially inwardly from a plane occupied by the other end of the cylindrical sleeve 3a of the sealing plate 3, that is, so as to be oriented towards the radial wall 3b of the sealing plate 3.

The elastic member 6 is provided on the base plate 5 so as to cover the inside of the base plate 5 and includes first and second side lips 6a and 6b, a radial lip 6c and an annular base 6d fitted to an inner peripheral surface of the base plate 5. As clearly shown in FIGS. 1 and 2, an outer peripheral portion of the annular base 6d of the elastic member 6 remote from the radial lip 6c has a thickness progressively decreasing so as to taper outwardly.

The first side lip 6a is formed so as extend radially outwardly and diagonally upwardly from the radial wall 5b of the base plate 5 with its free end capable of contacting the tilted wall 3c of the sealing plate 3. The second side lip 6b is formed so as to extend radially outwardly and diagonally upwardly from a portion adjacent a free end of the tilted wall 5c with its free end capable of contacting a non-tilted region of the radial wall 3b of the sealing plate 3. The radial lip 6c is formed so as to extend from the free end of the radial wall 5b in a direction radially inwardly and diagonally away from the radial wall 3b of the sealing plate 3 with its free end capable of contacting the cylindrical sleeve 3a of the sealing plate 3. Accordingly, in the assembled condition, the free end of the first side lip 6a is held in sliding contact with the tilted wall 3c of the sealing plate 3, the free end of the second side lip 6b is held in sliding contact with the radial wall 3b of the sealing plate, and the free end of the radial lip 6c is held in sliding contact with the cylindrical sleeve 3a of the sealing plate 3, wherefore an inner annular space IN between the inner and outer peripheral members 1 and 2 can be sealed from an outer space OT in a fluid-tight fashion as will become clear from the subsequent description.

When in use, the sealing device of the structure described above operates in the following manner. Assuming that a fluid medium such as, for example, muddy water splashes over the sealing device, the fluid medium may deposit on a radially outer surface of the first side lip 6a which is in contact with the inner surface of the sealing plate 3. However, since the tilted wall 3c is provided radially outwardly of the radial wall 3b of the sealing plate 3, a trap space S in which the fluid medium tends to be trapped has its volume retained as small as possible. For this reason, a possible reduction in sealing performance of the first side lip 6a which would be brought about by seizures of foreign matter such as sands and/or muddy particles contained in the fluid medium can be minimized to allow the first side lip 6a to exhibit an increased sealing performance. Where the inner peripheral member 1 serves as a rotary element, as shown in FIG. 2, an air current A is induced outside the radial wall 3c of the sealing plate 3 and, therefore, by the sucking effect brought about by the air current A, a liquid component of the fluid medium and/or the foreign matter trapped within the trap space S can advantageously be expelled readily to the outside of the sealing device without the sealing force being reduced. In the event that the fluid medium is eventually penetrated through the first side lip 6a of the sealing device, a sealing effect similar to that exhibited by the first side lip 6a as described above can be exhibited by the second side lip 6b held in contact with the sealing plate 3 at a location radially inwardly of the first side lip 6a. In addition, since the radial lip 6c is available at a portion further radially inwardly of the second side lip 6b, not only can a triple seal be obtained to seal the inner annular space IN off from the outer space OT to avoid an ingress of the fluid medium from the outer space OT into the inner annular space IN, but also any possible leakage of a lubricant oil within the inner annular space IN to the outer space OT can be advantageously avoided. In particular, since the radial lip 6c is formed so as to extend from the free end of the radial wall 5b in a direction radially inwardly and diagonally away from the radial wall 3b of the sealing plate 3 with its free end capable of contacting the cylindrical sleeve 3a of the sealing plate 3, the radial lip 6c can be urged towards the cylindrical sleeve 3a by the action of a pressure of the lubricant within the inner space IN to secure a considerable contact with the cylindrical sleeve 3a and, therefore, a sealing effect to the lubricant can be increased. It is to be noted that since the second side lip 6b extends a distance corresponding to the distance from the tilted wall 5c to the radial wall 3b, the second side lip 6b can have a reduced length.

FIGS. 3 to 7 illustrate second to sixth preferred embodiments of the present invention. In those figures, component parts which are like those shown in FIGS. 1 and 2 are designated by like reference numerals employed in FIGS. 1 and 2.

Figure 3:
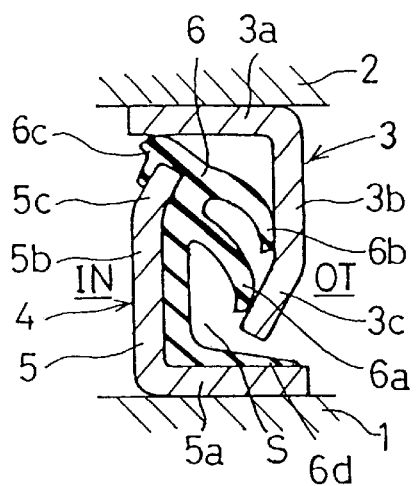
FIG. 3 is a fragmentary sectional view showing the sealing device according to a second preferred embodiment of the present invention.

In the second embodiment of the present invention shown in FIG. 3, the sealing device shown therein is substantially similar to that shown in FIGS. 1 and 2, but differs therefrom in that in the sealing device of FIG. 3 the sealing plate 3 and the sealing element 4, which have been shown and described as positioned adjacent and remote from the inner peripheral member 1, respectively, in the foregoing embodiment, are reversed in position in the radial direction and, hence, positioned remote from and adjacent the inner peripheral member 1. Specifically, in the sealing device shown in FIG. 3, the sealing plate 3 is fixedly mounted on the rotatable outer peripheral member 2 whereas the sealing element 4 is fitted to the stationary inner peripheral member 1. The sealing plate 3 has the radial wall 3b extending transverse to and radially inwardly from the cylindrical sleeve 3a with its free end continued to the tilted wall 3c. The sealing element 4 includes the elastic member 6 fitted to the base plate 5 so as to cover the inner surface of the base plate 5. The base plate 5 has the radial wall 5b extending transverse to and radially outwardly from the cylindrical bushing 5a with its free end continued to the tilted wall 5c. The elastic member 6 includes the first and second side lips 6a and 6b having their respective free ends contacting the tilted wall 3c of the sealing plate 3 and the non-tilted region of the radial wall 3b of the sealing plate 3 and also includes the radial lip 6c with its free end contacting the cylindrical sleeve 3a. The elastic member 6 has the annular base 6d covering the cylindrical bushing 5a and having a thickness progressively decreasing so as to taper outwardly. Other structural features of the sealing device shown in FIG. 3 are similar to those shown in FIG. 1.

With this structure, although no effect of expelling the fluid medium by the action of the centrifugal force can be obtained, other effects can be obtained as is the case with the structure shown in FIG. 1.

Figure 4:
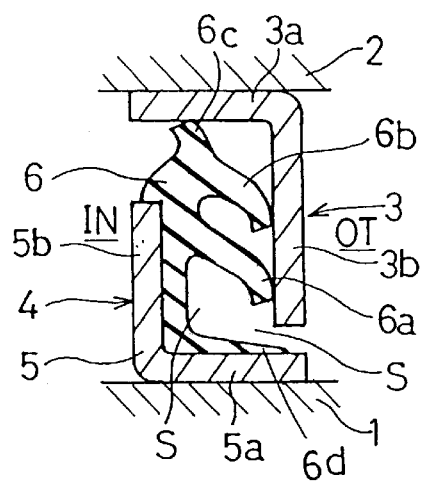
FIG. 4 is a fragmentary sectional view showing the sealing device according to a third preferred embodiment of the present invention.

FIG. 4 illustrates the sealing device according to a third preferred embodiment of the present invention. The sealing device shown in FIG. 4 is substantially similar to that shown in FIG. 3, but differs therefrom in that both of the tilted walls 5c and 3c employed in the sealing device of FIG. 3 are dispensed with in the sealing device of FIG. 4 and, instead, the radial wall 3b extends straight to a position adjacent the cylindrical bushing Sa of the base plate 5. In addition, the position at which the radial lip 6c contacts the cylindrical sleeve 3a of the sealing plate 3 is shifted from the radial wall 5b of the base plate 5 a slight distance towards the radial wall 3b of the sealing plate 3.

According to the third embodiment of the present invention shown in FIG. 4, although a function of reducing the volume exhibited by the tilted wall 3c in the first embodiment of the present invention shown in FIGS. 1 and 2 would not be obtained, increase of the sealing effect brought about by reduction in volume of the trap space S can be expected because of the dual use of the first and second side lips 6a and 6b.

Figure 5:
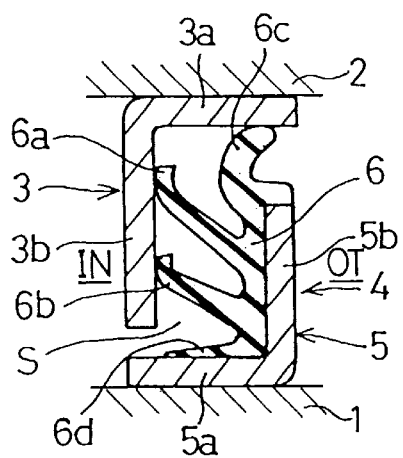
FIG. 5 is a fragmentary sectional view showing the sealing device according to a fourth preferred embodiment of the present invention.

In a fourth preferred embodiment of the present invention shown in FIG. 5, the sealing device shown therein is substantially similar to that shown in FIG. 4, but differs therefrom in that the sealing plate 3 and the sealing element 4 shown as positioned on right and left in FIG. 4 are reversed in position to allow the sealing plate 3 and the sealing element 4 to occupy respective positions occupied by the sealing element 4 and the sealing plate 3 in FIG. 4. In addition, the radial lip 6c employed in the sealing device of FIG. 5 is curled backwards to allow its free end to be held in contact with a portion close to the free end of the cylindrical sleeve 3a of the sealing plate 3.

Figure 6:
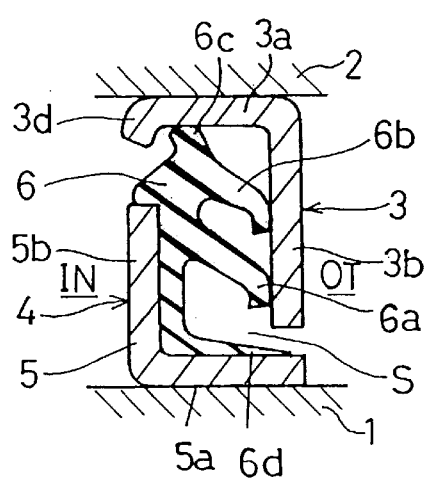
FIG. 6 is a fragmentary sectional view showing the sealing device according to a fifth preferred embodiment of the present invention.

In a fifth preferred embodiment of the present invention shown in FIG. 6, the sealing device shown therein is substantially similar to the sealing device shown in FIG. 4, but differs therefrom in that in the sealing device of FIG. 6 the free end of the cylindrical sleeve 3a of the sealing plate 3 is formed with a curved wall 3d that is radially inwardly curved from the free end of the cylindrical sleeve 3a.

Figure 7:
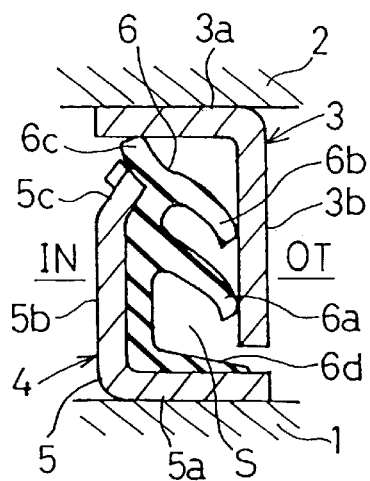
FIG. 7 is a fragmentary sectional view showing the sealing device according to a sixth preferred embodiment of the present invention.
Figure 8:
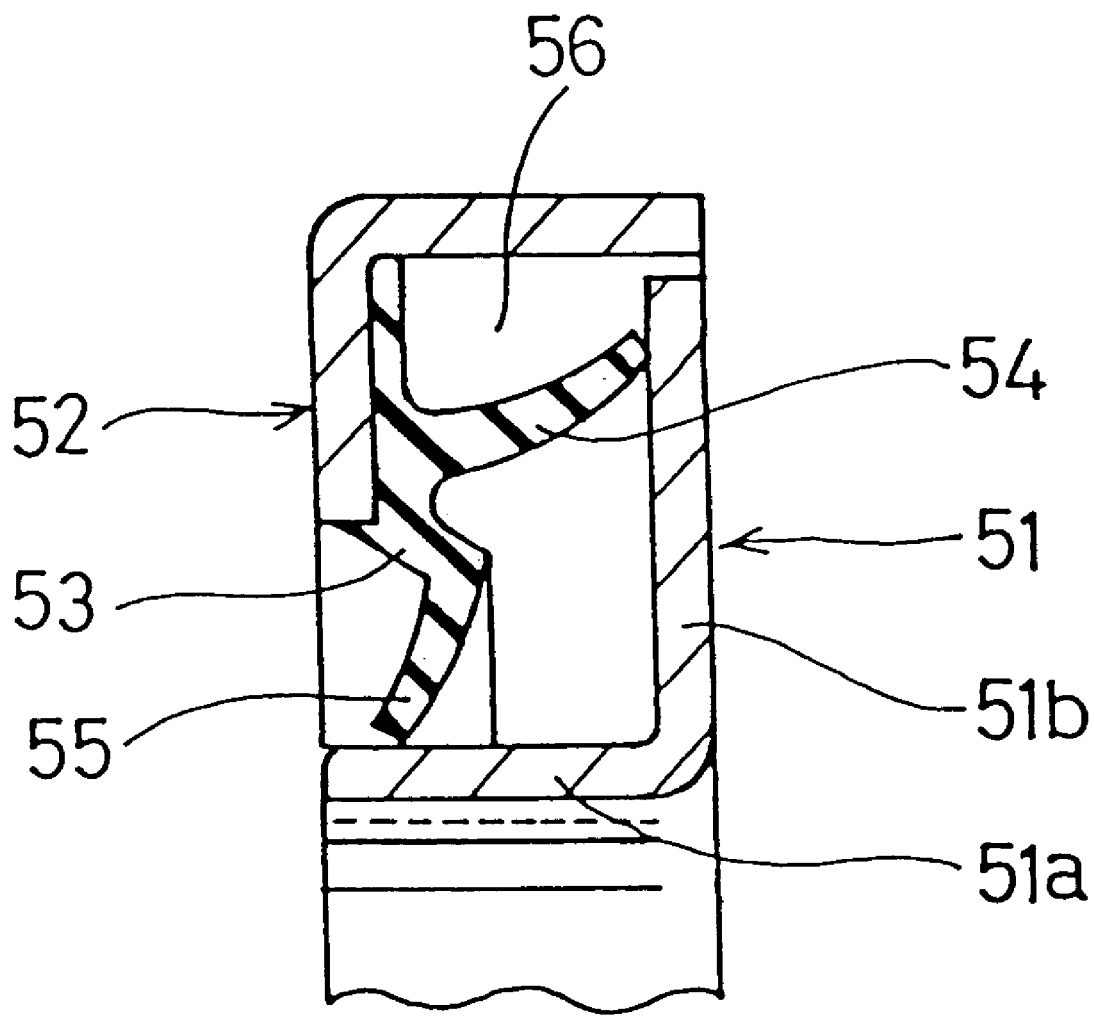
FIG. 8 is a fragmentary sectional view showing the prior art sealing device.

FIG. 7 illustrates the sealing device according to a sixth preferred embodiment of the present invention. In this embodiment, the sealing device is substantially similar to that according to the second embodiment of the present invention shown in FIG. 3, but differs therefrom in that the tilted wall 3c of the sealing plate 3 employed in the sealing device of FIG. 3 is dispensed with and, instead, the radial wall 3b of the sealing plate 3 extends radially inwardly straight to a position adjacent the cylindrical bushing 5a of the base plate 5.

Even in the sealing device according to any one of the fourth to sixth embodiments of the present invention shown in FIGS. 5, 6 and 7, respectively, reduction of the volume of the trap space S brought about by the dual use of the first and second side lips 6a and 6b, increase of the sealing performance brought about by the dual seal, and an effect of sealing the lubricant oil brought about by the radial lip 6c can be obtained as is the case with the sealing device according to the third embodiment of the present invention shown in FIG. 4. It is to be noted that in any one of the second to sixth embodiments of the present invention, the sealing plate and the sealing element 4, although shown as positioned adjacent and fitted to the outer and inner peripheral members 2 and 1, respectively, may be positioned adjacent and fitted to the inner and outer peripheral members 1 and 2, respectively.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sealing device for sealing a space between inner and outer peripheral members rotatable relative to each other, said sealing device comprising:

a sealing plate of a generally L-shaped cross-section fitted to one of the inner and outer peripheral members, said sealing plate including a cylindrical sleeve and a radial wall, said radial wall having a first end connected to said cylindrical sleeve and a second, free end formed by a tilted wall extending from a radial portion of said radial wall and inclined inwardly of the sealing plate, said second free end being an end remote from said first end;

a sealing element fitted to the other of the inner and outer peripheral members so as to confront the sealing plate, said sealing element comprising a base plate of a generally L-shaped cross-section including a radial wall;

an elastic member provided on the base plate and including a first side lip and a radial lip, said first side lip extending from the radial wall of the base plate and having a free end held in contact with the second free end formed by the tilted wall of the sealing plate, said radial lip extending from the radial wall of the base plate and having a free end held in contact with the cylindrical sleeve of the sealing plate.

2. The sealing device as claimed in claim 1, wherein said elastic member in the sealing element also includes a second side lip extending from a portion adjacent a free end of the radial wall of the base plate and having a free end held in contact with the radial portion of the radial wall of the sealing plate between said first end and a first end of the tilted wall connected to the radial portion of the radial wall.

3. The sealing device as claimed in claim 2, wherein the base plate of the sealing element also includes a tilted wall formed therewith so as to incline towards the radial wall of the sealing plate and wherein said second side lip extends from the tilted wall of the base plate and contacts the radial wall of the sealing plate.

4. The sealing device as claimed in claim 1, wherein said radial lip has the free end extending in a direction counter to the radial wall of the sealing plate.

5. The sealing device as claimed in claim 1, wherein said sealing plate is fitted to the inner peripheral member which is rotatable.

6. The sealing device as claimed in claim 1, wherein said sealing plate is fitted to the outer peripheral member which is rotatable.

7. The sealing device as claimed in claim 1, wherein said base plate includes a cylindrical bushing, and said elastic member includes an annular base covering the cylindrical bushing.

* * * * *